United States Patent
Kim et al.

(10) Patent No.: US 11,966,439 B2
(45) Date of Patent: Apr. 23, 2024

(54) METHOD FOR PROVIDING VOICE ASSISTANT SERVICE AND ELECTRONIC DEVICE SUPPORTING THE SAME

(71) Applicant: SAMSUNG ELECTRONICS CO., LTD., Suwon-si (KR)

(72) Inventors: Sunok Kim, Suwon-si (KR); Soonhee Jo, Suwon-si (KR); Sunbeom Kwon, Suwon-si (KR); Kiwan Eom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 17/715,763

(22) Filed: Apr. 7, 2022

(65) Prior Publication Data

US 2022/0318304 A1    Oct. 6, 2022

Related U.S. Application Data

(63) Continuation of application No. PCT/KR2022/004023, filed on Mar. 23, 2022.

(30) Foreign Application Priority Data

Mar. 25, 2021    (KR) .................. 10-2021-0038469

(51) Int. Cl.
*G06F 16/68*    (2019.01)
*G06F 16/61*    (2019.01)
*G06F 16/64*    (2019.01)

(52) U.S. Cl.
CPC ............ *G06F 16/686* (2019.01); *G06F 16/61* (2019.01); *G06F 16/64* (2019.01)

(58) Field of Classification Search
CPC ........ G06F 16/686; G06F 16/61; G06F 16/64; G06F 16/68; G10L 15/22; G10L 15/04; G10L 15/14; G10L 15/183; G10L 15/30
See application file for complete search history.

(56) References Cited

U.S. PATENT DOCUMENTS

| 11,227,589 B2* | 1/2022 | Booker ................. G10L 15/08 |
| 2014/0350925 A1 | 11/2014 | Park et al. |
| 2015/0142436 A1 | 5/2015 | Bokish et al. |

(Continued)

FOREIGN PATENT DOCUMENTS

| KR | 10-1456974 | 10/2014 |
| KR | 10-2016-0052727 | 5/2016 |

(Continued)

OTHER PUBLICATIONS

Search Report and Written Opinion dated Jun. 27, 2022 issued in International Patent Application No. PCT/KR2022/004023.

*Primary Examiner* — Angelica Ruiz

(74) *Attorney, Agent, or Firm* — Nixon & Vanderhye P.C.

(57) ABSTRACT

A method for providing a voice assistant service of an electronic device may include: detecting a voice assistant update; determining whether a supportable utterance exists in an updated list; based on there being a supportable utterance in the updated list, comparing utterances stored in a database with the updated list and determining whether a matched utterance exists; based on there being a matched utterance, storing the matched utterance as a recommended utterance list; and recommending an utterance based on the recommended utterance list.

20 Claims, 8 Drawing Sheets

(56) References Cited

U.S. PATENT DOCUMENTS

| | | | |
|---|---|---|---|
| 2015/0221300 A1 | 8/2015 | Sukhomlinov | |
| 2018/0322872 A1 | 11/2018 | Cha et al. | |
| 2019/0057701 A1 | 2/2019 | Kim et al. | |
| 2019/0189113 A1 | 6/2019 | Hecht et al. | |
| 2019/0341030 A1* | 11/2019 | Hammons | G10L 17/00 |
| 2019/0392819 A1 | 12/2019 | Shin et al. | |
| 2020/0027456 A1 | 1/2020 | Kim et al. | |
| 2020/0150934 A1 | 5/2020 | Webster et al. | |
| 2020/0219483 A1 | 7/2020 | Park et al. | |
| 2020/0335187 A1* | 10/2020 | Lefkofsky | G16H 50/20 |
| 2020/0410992 A1* | 12/2020 | Lee | G10L 15/26 |
| 2021/0089269 A1 | 3/2021 | Kim et al. | |
| 2021/0134272 A1* | 5/2021 | Saito | G10L 15/10 |
| 2021/0326421 A1* | 10/2021 | Khoury | G10L 17/08 |
| 2022/0232278 A1 | 7/2022 | Park | |

FOREIGN PATENT DOCUMENTS

| | | |
|---|---|---|
| KR | 10-2018-0122106 | 11/2018 |
| KR | 10-2019-0018886 | 2/2019 |
| KR | 10-2019-0083884 | 7/2019 |
| KR | 10-2019-0096307 | 8/2019 |
| KR | 10-2020-0013152 | 2/2020 |
| KR | 10-2021-0001937 | 1/2021 |
| WO | 2020/017166 | 1/2020 |
| WO | 2020/222322 | 11/2020 |

* cited by examiner

METHOD FOR PROVIDING VOICE ASSISTANT SERVICE AND ELECTRONIC DEVICE SUPPORTING THE SAME

CROSS-REFERENCE TO RELATED APPLICATIONS

This application is a continuation of International Application No. PCT/KR2022/004023 designating the United States, filed on Mar. 23, 2022, in the Korean Intellectual Property Receiving Office and claiming priority to Korean Patent Application No. 10-2021-0038469, filed on Mar. 25, 2021, in the Korean Intellectual Property Office, the disclosures of which are incorporated by reference herein in their entireties.

BACKGROUND

Field

The disclosure relates to a method for providing a voice assistant service and an electronic device supporting the same.

Description of Related Art

An artificial intelligence (AI) agent including a voice assistant is capable of performing a task requested by a user and providing information or services according to the requested task. The AI agent can understand user's utterances and provide a service according to the intent of utterances.

The AI agent guides the user to the use of available functions with 'representative utterances' which is the most common expression. However, in an actual use environment, the user may use the AI agent through various utterances based on his or her usual utterance habits.

Depending on user's various utterance aspects, the voice assistant may not be able to perform the task. Although the voice assistant supplements user's frequently used patterns and various functions through updates, the user does not know that his/her failed utterance has been supplemented.

SUMMARY

Embodiments of the disclosure provide a voice assistant service and an electronic device supporting the same intended to store uttered contents and its results in a voice assistant and, if there is a supportable utterance by an update of the voice assistant later, recommend the supportable utterance to a user.

According to various example embodiments of the disclosure, a method for providing a voice assistant service of an electronic device may include: detecting a voice assistant update; determining whether a supportable utterance exists in an updated list; based on there being the supportable utterance in the updated list, comparing utterances stored in a database with the updated list and determining whether a matched utterance exists; based on there being the matched utterance, storing the matched utterance in a recommended utterance list; and recommending an utterance based on the recommended utterance list.

According to various example embodiments of the disclosure, an electronic device includes: a communication module comprising communication circuitry; a display module comprising a display; a memory; and a processor, wherein the processor may be configured to: detect a voice assistant update, determine whether a supportable utterance exists in an updated list, based on there being the supportable utterance in the updated list, compare utterances stored in a database with the updated list and determine whether a matched utterance exists, based on there being the matched utterance, control the memory to store the matched utterance in a recommended utterance list, and recommend an utterance based on the recommended utterance list.

A method for providing a voice assistant service according to various example embodiments of the disclosure and an electronic device supporting the same can increase the user's utility of the voice assistant service by recommending utterances that become supportable through functional improvement.

BRIEF DESCRIPTION OF THE DRAWINGS

The above an other aspects, features and advantages of certain embodiments of the present disclosure will be more apparent from the following detailed description, taken in conjunction with the accompanying drawings, in which.

DETAILED DESCRIPTION

Figure 1:
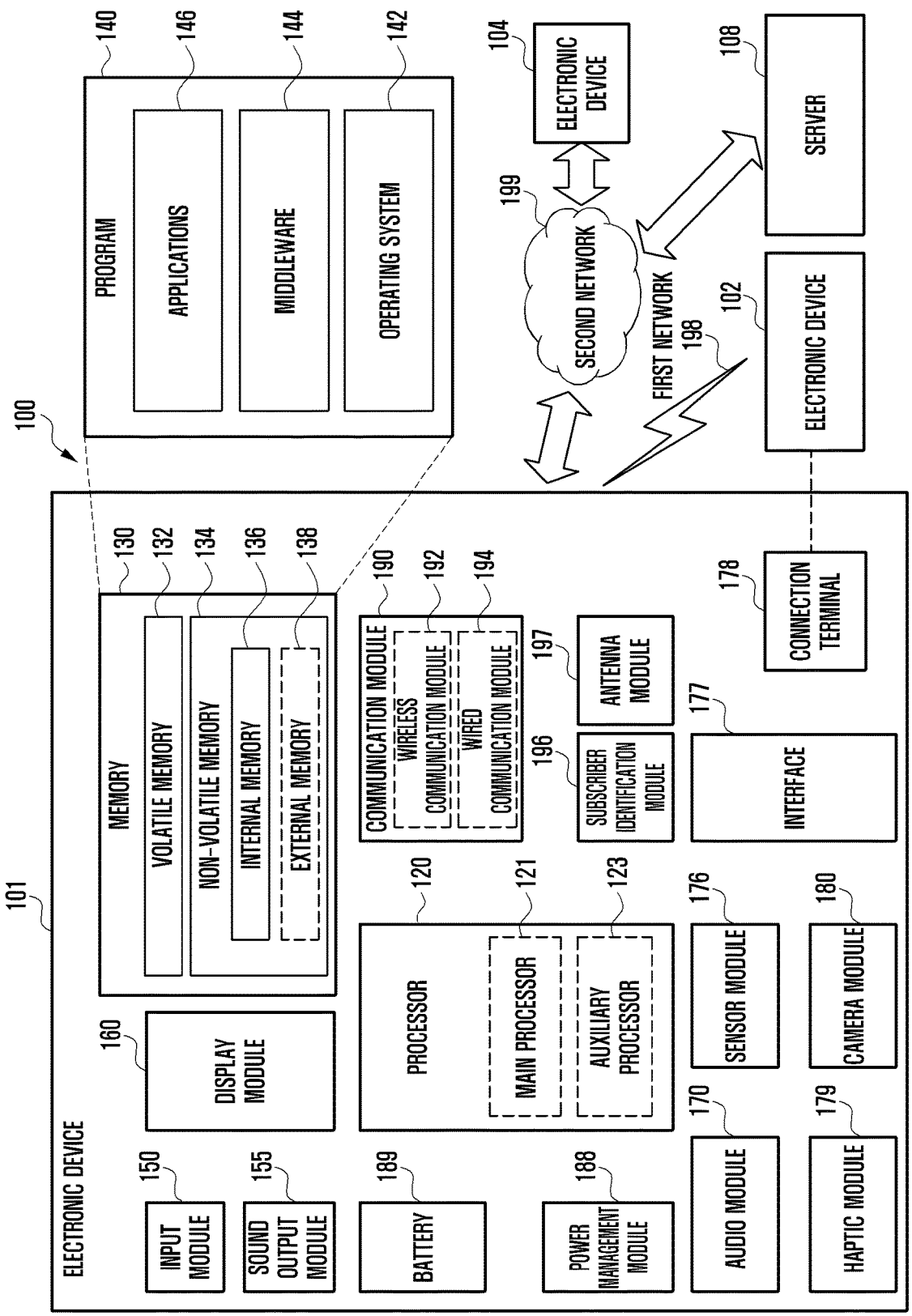
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power manage ment module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from an other component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphic s processing unit (GPU), a neural processing unit (NPU), an image sign al processor (ISP), a sensor hub processor, or a communication process or (CP)) that is operable independently from, or in conjunction or, with the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence mode l processing. An artificial intelligence model may be generated by machine learning. Such learning may be performed, e.g., by the electronic de vice 101 where the artificial intelligence is performed or via a separate server (e.g., the server 108). Learning algorithms may include, but are not limited to, e.g., supervised learning, unsupervised learning, semi-super vised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal an d vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanic al stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a second ary cell which is rechargeable, or a fuel cell.

The communication module 190 may support establishing a direct (e.g., wired) communication channel or a wireless communication channel bet ween the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wire less communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
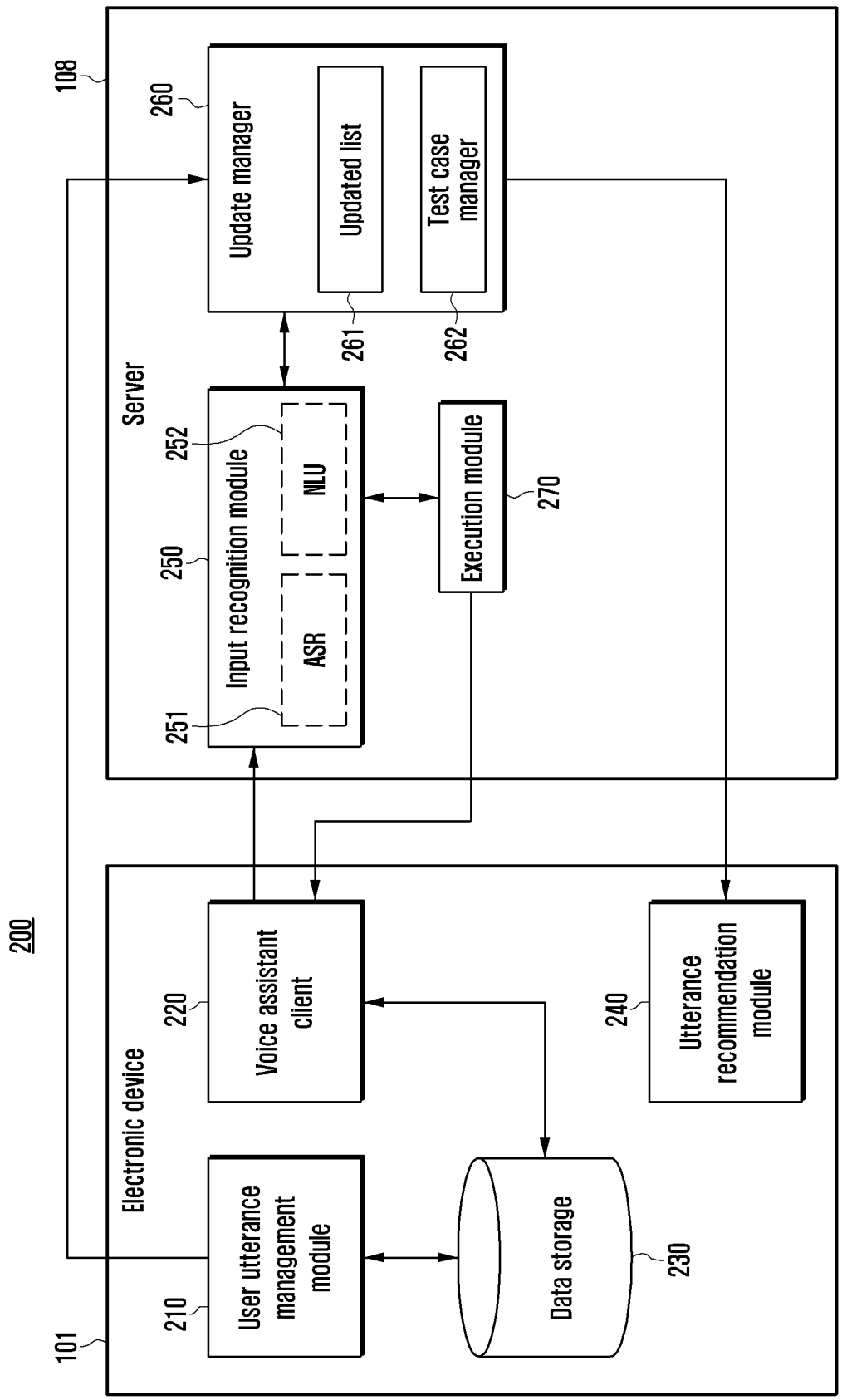
FIG. 2 is a block diagram illustrating an example configuration of a voice assistant including an electronic device and a server according to various embodiments.

FIG. 2 is a block diagram illustrating an example configuration of a voice assistant 200 including an electronic device 101 and a server 108 according to various embodiments.

The voice assistant 200 may include the electronic device 101 and the server 108.

The electronic device 101 may include a user utterance management module (e.g., including various processing circuitry and/or executable program instructions) 210, a voice assistant client (e.g., including various processing circuitry and/or executable program instructions) 220, a data storage 230, and/or an utterance recommendation module (e.g., including various processing circuitry and/or executable program instructions) 240.

Under the control of a processor (e.g., the processor 120 in FIG. 1), the user utterance management module 210 may control the data storage 230 to store a voice command uttered to the electronic device 101 and/or the voice assistant 200 and store a result of the voice command. When the user utters the voice command to the electronic device 101 and/or the voice assistant 200, the user utterance management module 210 may store such an utterance and a task executed by the voice assistant 200 based on the utterance in the data storage under the control of the processor 120.

For example, when the user utters a voice command such as "How is the weather today?" to the electronic device 101 and/or the voice assistant 200, the electronic device 101 and/or the voice assistant 200 may provide an answer such as "The weather will be sunny on September 25 in Seoul." as a result. The user utterance management module 210 may store the utterances "How is the weather today?" and the corresponding result "The weather will be sunny on September 25 in Seoul" in the data storage 230.

In various embodiments, the user utterance management module 210 may store or analyze information related to utterances under the control of the processor 120.

The voice assistant client 220 may transmit a user's voice to the server 108 through the communication module 190 under the control of the processor 120.

From the server 108 through the communication module (e.g., including communication circuitry) 190, the electronic device 101 may receive, as a result of the utterance, a command to execute an application or function included in the electronic device 101. The voice assistant client 220 may deliver a command received from the server 108 to the application and/or the function.

The data storage 230 may be the memory 130. The data storage 230 may store, as a database, the uttered voice command and the result of the voice command managed by the user utterance management module 210. The data storage 230 may store information analyzed in relation to the utterance managed by the user utterance management module 210. The data storage 230 may store a database managed by the user utterance management module 210. The data storage 230 may store functions and/or information corresponding to an execution result from the voice assistant client 220 in the database managed by the user utterance management module 210 included in the data storage 230.

When the voice assistant 200 is updated, the utterance recommendation module 240 may receive an updated list 261 from an update manager (e.g., including various processing circuitry and/or executable program instructions) 260 of the server 108 through the communication module 190.

The utterance recommendation module 240 may compare the received updated list 261 with utterances in the database managed by the user utterance management module 210 and thereby determine whether a matched utterance exists.

The utterance recommendation module 240 may determine the priorities of utterance recommendation based on utterances and priorities that match between the updated list 261 and the pre-stored user utterances.

The utterance recommendation module 240 may collectively manage all example utterances (e.g., recommended utterances, hints, or manual examples) to be provided to the user through the electronic device 101. The example utterances (e.g., recommended utterances, hints, or manual examples) may be displayed as a user interface on the display module 160 of the electronic device 101.

The utterance recommendation module 240 may record new recommended utterances determined through the utterance recommendation priorities in recommended utterance data. The utterance recommendation module 240 may display updated contents of the recommended utterance data as a user interface (UI) on the display module 160.

The server 108 may include an input recognition module (e.g., including various processing circuitry and/or executable program instructions) 250, an update manager (e.g., including various processing circuitry and/or executable program instructions) 260, and/or an execution module (e.g., including various processing circuitry and/or executable program instructions) 270.

The input recognition module 250 may include at least one of an automatic speech recognition (ASR) (e.g., including various processing circuitry and/or executable program instructions) 251 and a natural language understanding (NLU) (e.g., including various processing circuitry and/or executable program instructions) 252.

The ASR 251 may convert voice data including a user utterance received from the voice assistant client 220 into text data that the NLU 252 can analyze.

The NLU 252 may extract at least one of a domain of an utterance, an intent of an utterance, or a parameter, based on the text data received from the ASR 251.

In various embodiments, the NLU 252 may identify at least one of a domain of an utterance, an intent of an utterance, or a parameter, based on the text data received from the ASR 251.

The intent may refer to an operation to be performed by the electronic device 101 (or the server 108), and the parameter may refer to a factor required to perform such an operation.

For example, the NLU 252 may receive text data (e.g., "How is the weather today?") from the ASR 251. From text 'weather' contained in the text data, the NLU 252 may identify that this utterance belongs to a domain related to the weather. From this utterance, the NLU 252 may identify a user's intent to ask about the weather. From this utterance, the NLU 252 may extract a parameter "today".

The execution module 270 may generate an execution result based on the utterance identified by the input recognition module 250. The execution module 270 may generate the execution result based on at least one of the utterance domain, the utterance intent, or the parameter identified by the input recognition module 250. The execution module 270 may identify a function and/or information corresponding to the execution result, convert the identified function and/or information into a language understandable by the user, and transmit the language to the voice assistant client 220. The execution module 270 may identify a function and/or information corresponding to the execution result and transmit it to the voice assistant client 220. For example, the execution module 270 may provide, as a result, an answer such as "The weather will be sunny on September 25 in Seoul" to the voice assistant client 220. The voice assistant client 220 may store a function and/or information corresponding to the execution result received from the execution module 270 in the data storage 230.

The update manager 260 may include an updated list 261 and a test case manager 262.

The update manager 260 may receive an issue detected at the voice assistant client level and manage it in the test case manager 262.

When there are new updates to the voice assistant 200, the update manager 260 may manage the updates.

When a new function is added, the update manager 260 may manage the range of utterances capable of processing the new function using the test case manager 262.

The test case manager 262 may check whether the utterance is successful, and a supportable utterance that has passed the test case manager 262 may be stored in the updated list 261.

The updated list 261 may be transmitted to the utterance recommendation module 240 of the electronic device 101. In various embodiments, if there is an update of the voice assistant 200, the updated list 261 may be transmitted to the utterance recommendation module 240 of the electronic device 101.

When the number of utterances whose issue priority is greater than or equal to a predetermined (e.g., specified) criterion is greater than or equal to a predetermined (e.g., specified) number, the user utterance management module 210 may transmit a problematic utterance to the update manager 260 through the communication module 190.

The update manager 260 may receive the problematic utterance from the user utterance management module 210, and the problematic utterance may be managed through the test case manager 262 of the update manager 260.

Figure 3:
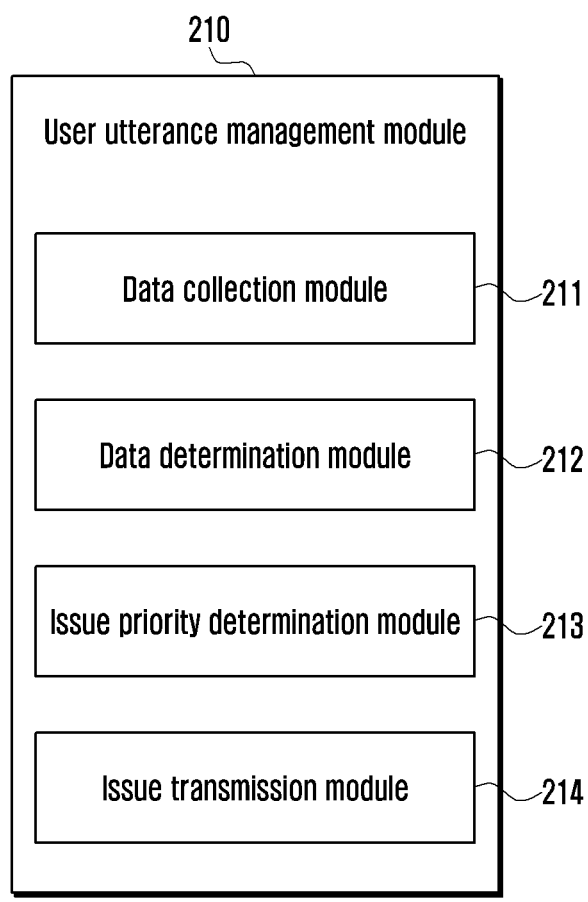
FIG. 3 is a block diagram illustrating an example configuration of a user utterance management module of an electronic device according to various embodiments.

FIG. 3 is a block diagram illustrating an example configuration of a user utterance management module 210 of an electronic device 101 according to various embodiments.

The user utterance management module (e.g., including various processing circuitry and/or executable program instructions) 210 may include a data collection module (e.g., including various processing circuitry and/or executable program instructions) 211, a data determination module (e.g., including various processing circuitry and/or executable program instructions) 212, an issue priority determination module (e.g., including various processing circuitry and/or executable program instructions) 213, and/or an issue transmission module (e.g., including various processing circuitry and/or executable program instructions) 214.

The data collection module 211 may collect user utterances and execution results according to the user utterances, based on a database as shown in Table 1.

TABLE 1

| Latest Timestamp | Utterance | Goal | Frequency | Pass/Fail | Issue Priority | Utterance Recommend Priority |
|---|---|---|---|---|---|---|
| 20200925 10:00 | How is the weather today | Weather | 100 | Pass | NA | NA |
| 20200925 09:00 | Connect the navigation | Rejection | 5 | Fail | 1 | 1 |

In Table 1, the latest timestamp may be a field indicating the last time the user made the corresponding utterance. When the same utterance is repeated several times, the last utterance time may be indicated. For example, if the user utters "How is the weather today?" at 10:00 AM on Sep. 25, 2020, the data collection module 211 may store it as 20200925 10:00 in the latest timestamp of the database. In Table 1, the utterance is a field for recoding the contents of a user's utterance, and, for example, "How is the weather today" may be recorded.

In Table 1, the goal may be a field for recording a function execution result corresponding to a user's utterance and may include log information indicating, for example, that a function informing about weather has been performed.

In Table 1, the frequency may be a field for recording the frequency of a user's utterance and may be recorded (or updated) together with the latest timestamp whenever the same utterance is repeatedly received. For example, a user's utterance "How is the weather today?" is received for the 100th time, the number 100 may be recorded.

The data determination module 212 may determine whether a user's utterance succeeds or fails, based on the execution result of the data collected through the data collection module 211. For example, if a function is not supported by the voice assistant 200, data may be recorded in the fields of latest timestamp, utterance, and frequency, and a rejection may be recorded in the goal field as a result of failing to perform the corresponding utterance. For example, if a function is supported by the voice assistant 200, data may be recorded in the fields of latest timestamp, utterance, and frequency, and an executed result may be recorded in the goal field.

The data determination module 212 may determine the success and/or failure of an execution result, based on a failure determination condition. The failure determination condition may be at least one of a case where an execution result is clearly a failure, a case where an unsupported utterance is treated as an error, and a case where difference execution results occur between highly similar utterances. For example, the case where different execution results occur between highly similar utterances may be a case where the utterance domains are different and/or a case where the utterance domains are the same but have different goals.

According to various embodiments, in at least one of the case where an execution result is clearly a failure, the case where an unsupported utterance is treated as an error, and the case where difference execution results occur between highly similar utterances, the data determination module 212 may record the execution result as FAIL in the pass/fail field.

For example, in case of a function that the voice assistant 200 does not support, the data determination module 212 may determine it as the case where an unsupported utterance is treated as an error, and record the execution result as FAIL.

The issue priority determination module 213 may determine an issue priority based on the data collected through the data collection module 211 and record it in the issue priority field.

The issue priority determination module 213 may determine a priority based on data regarding the latest timestamp, the goal, the failure determination condition, and/or the frequency, and record the issue priority in the issue priority field. The issue may refer, for example, to the occurrence of a problem of utterance, and the issue priority may refer to the priority of managing the problem of utterance. The issue priority determination module 213 may determine the priority of utterance problem management based on the data regarding the latest timestamp, the goal, the failure determination condition, and/or the frequency.

In case of an utterance determined as a success utterance, the issue priority determination module 213 may exclude it from determining the issue priority, and the priority may be recorded among utterances recorded as FAIL according to the failure determination condition.

The issue transmission module 214 may transmit utterances to the update manager 260 through the communication module 190 when the number of utterances whose issue priority is greater than or equal to a predetermined (e.g., specified) criterion is greater than or equal to a predetermined (e.g., specified) number.

Figure 4:
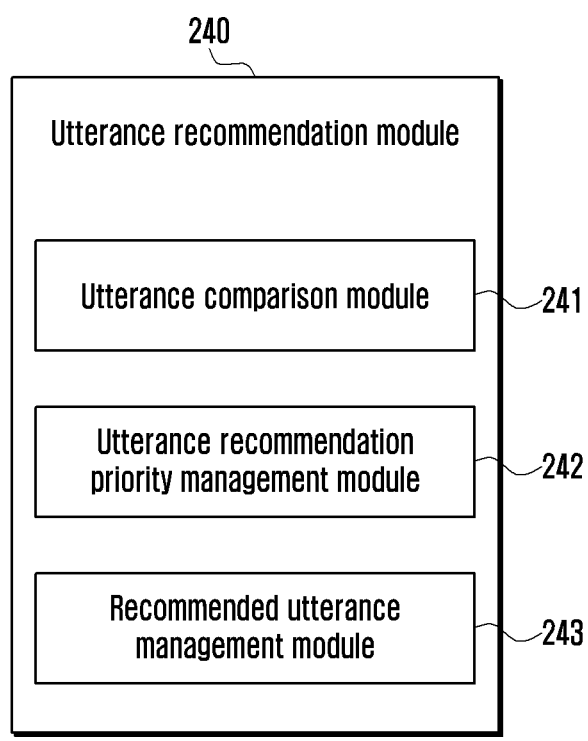
FIG. 4 is a block diagram illustrating an example configuration of an utterance recommendation module according to various embodiments.

FIG. 4 is a block diagram illustrating an example configuration of an utterance recommendation module 240 according to various embodiments.

The utterance recommendation module 240 may include an utterance comparison module (e.g., including various processing circuitry and/or executable program instructions) 241, an utterance recommendation priority management module (e.g., including various processing circuitry and/or executable program instructions) 242, and/or a recommended utterance management module (e.g., including various processing circuitry and/or executable program instructions) 243.

The utterance comparison module 241 may compare the updated list 261 received from the update manager 260 with the utterances stored in the database and thereby determine whether there is a corresponding content.

The utterance recommendation priority management module 242 may determine an utterance recommendation priority based on data recorded in the field regarding the latest timestamp, the frequency, or the issue priority from among corresponding utterances between the received updated list 261 and the utterances stored in the database. The recommended utterance management module 243 may determine an utterance recommendation priority and store the utterance recommendation priority in the utterance recommendation priority field.

With reference to Table 1, upon receiving the updated list 261 including the function support for an utterance "connect the navigation", the utterance recommendation priority management module 242 may determine an utterance recommendation priority for the utterance "connect the navigation" and record the utterance recommendation priority in the utterance recommendation priority field.

The recommended utterance management module 243 may manage all example utterances which can be provided to the user through the electronic device 101. The recommended utterance management module 243 may store a list of new recommended utterances and/or recommended utterances determined through the utterance recommendation priority as shown in Table 2 below.

TABLE 2

| Recommended Region | Utterance | Goal | Last Updated Date |
| --- | --- | --- | --- |
| Hint | Set the alarm | Clock | 2021 Jan. 1 |
| Main Screen | Connect the navigation | Navigation | 2021 Jan. 1 |
| Tipcard | Clean up the memory | System | 2021 Jan. 1 |

The recommended utterance management module 243 may display a user interface on the display module 160 based on the recommended utterance data.

Figure 5:
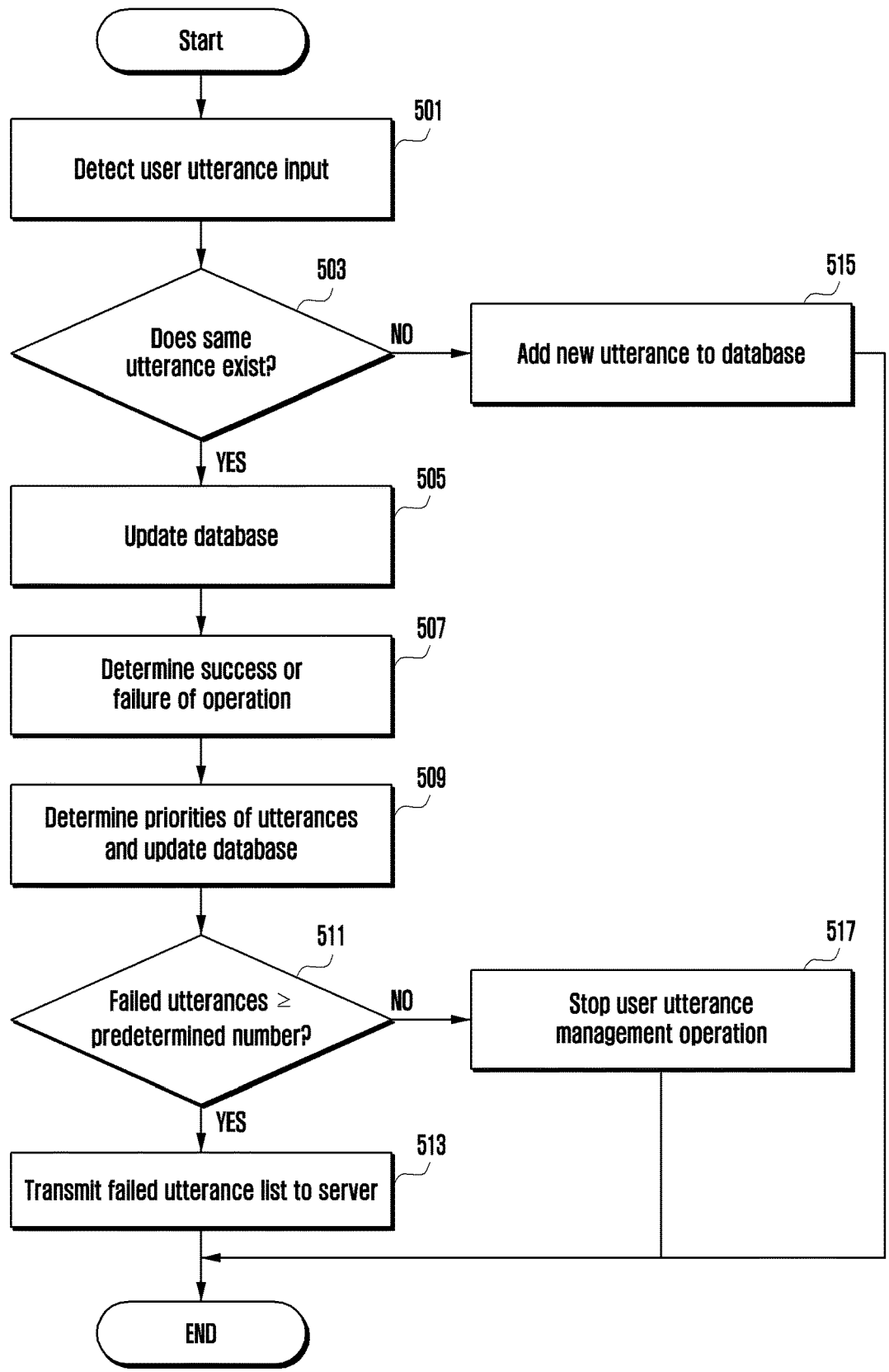
FIG. 5 is a flowchart illustrating an example method for providing a voice assistant service by an electronic device according to various embodiments.

FIG. 5 is a flowchart illustrating an example method for providing a voice assistant service by an electronic device 101 according to various embodiments.

At operation 501, the electronic device 101 may detect a user utterance input under the control of the processor 120. In various embodiments, the electronic device 101 may detect the user utterance input through the input module 150 under the control of the processor 120.

At operation 503, under the control of the processor 120, the electronic device 101 may determine whether the same utterance as the detected user utterance input exists.

According to various embodiments, the operation 503 that the electronic device 101 determines under the control of the processor 120 whether the same utterance as the detected user utterance input exists may be an operation of determining whether all of the detected user utterance and converted text data are the same utterance.

According to various embodiments, at the operation 503 of determining under the control of the processor 120 whether the same utterance as the detected user utterance input exists, even if a previous utterance is different from the detected user utterance input, but when they are identical with each other in the domain of utterance, the intent of utterance, and/or the parameter, the electronic device 101 may determine that the previous utterance is the same utterance as the detected user utterance input.

For example, at the operation 503, even if there is a variation between a previous utterance "What is the weather today?" and the detected utterance "How is the weather today?" (thus two utterances are not exactly the same), but when they are identical with each other in the domain of utterance, the intent of utterance, and/or the parameter, the electronic device 101 may determine under the control of the processor 120 that the previous utterance is the same utterance as the detected user utterance input.

If the same utterance as the detected user utterance input exists at the operation 503 ('Yes' branch of the operation 503), the electronic device 101 may perform operation 505 under the control of the processor 120.

If the same utterance as the detected user utterance input does not exist at the operation 503 ('No' branch of the operation 503), the electronic device 101 may perform operation 515 under the control of the processor 120.

At the operation 505, the electronic device 101 may update database under the control of the processor 120.

For example, if the same utterance as the detected user utterance input exists, the electronic device 101 may store and/or update the user utterance in the database under the control of the processor 120 at the operation 505.

According to various embodiments, if the same utterance as the detected user utterance input exists, the electronic device 101 may store and/or update the user utterance in the database using the user utterance management module 210 under the control of the processor 120 at the operation 505.

When updating the database at the operation 505, the electronic device 101 may update the utterance field, the goal field, and/or the latest timestamp field under the control of the processor 120. When the same utterance exists, the electronic device 101 may update the frequency field and the latest timestamp field of a pre-stored utterance, based on the user utterance, under the control of the processor 120 at the operation 505.

If the same utterance as the detected user utterance input does not exist, the electronic device 101 may add a new utterance to the database under the control of the processor 120 at the operation 515. The frequency field may be recorded as 1.

At operation 507, under the control of the processor 120, the electronic device 101 may determine success or failure according to a result of an operation corresponding to the user utterance.

At the operation 507, under the control of the processor 120, the electronic device 101 may determine whether the operation corresponding to the user utterance succeeds or fails, based on a failure determination condition. The failure determination condition may be at least one of a case where an execution result is clearly a failure, a case where an unsupported utterance is treated as an error, and a case where different execution results occur between highly similar utterances.

When the result of the operation corresponding to the user utterance is success, the electronic device 101 may record PASS in the pass/fail field of the database under the control of the processor 120 at the operation 507.

When the result of the operation corresponding to the user utterance is failure, the electronic device 101 may record FAIL in the pass/fail field of the database under the control of the processor 120 at the operation 507.

At operation 509, under the control of the processor 120, the electronic device 101 may determine priorities of utterances recorded as failures and update the issue priorities in the issue priority field of the database.

At operation 511, under the control of the processor 120, the electronic device 101 may determine whether the number of failed utterances is greater than or equal to a predetermined (e.g., specified) number, based on the issue priorities.

According to various embodiments, at the operation 511, under the control of the processor 120, the electronic device 101 may determine, based on the issue priorities stored in the database, whether the number of failed utterances greater than or equal to a predetermined priority is greater than or equal to the predetermined number.

If the number of failed utterances is greater than or equal to the predetermined number at the operation 511 ('Yes' branch of the operation 511), the electronic device 101 may perform operation 513 under the control of the processor 120.

If the number of failed utterances is less than the predetermined (e.g., specified) number at the operation 511 ('No' branch of the operation 511), the electronic device 101 may perform operation 517 under the control of the processor 120.

At the operation 513, the electronic device 101 may transmit a failed utterance list to the server 108 under the control of the processor 120.

At the operation 517, the electronic device 101 may stop the user utterance management operation under the control of the processor 120.

Figure 6:
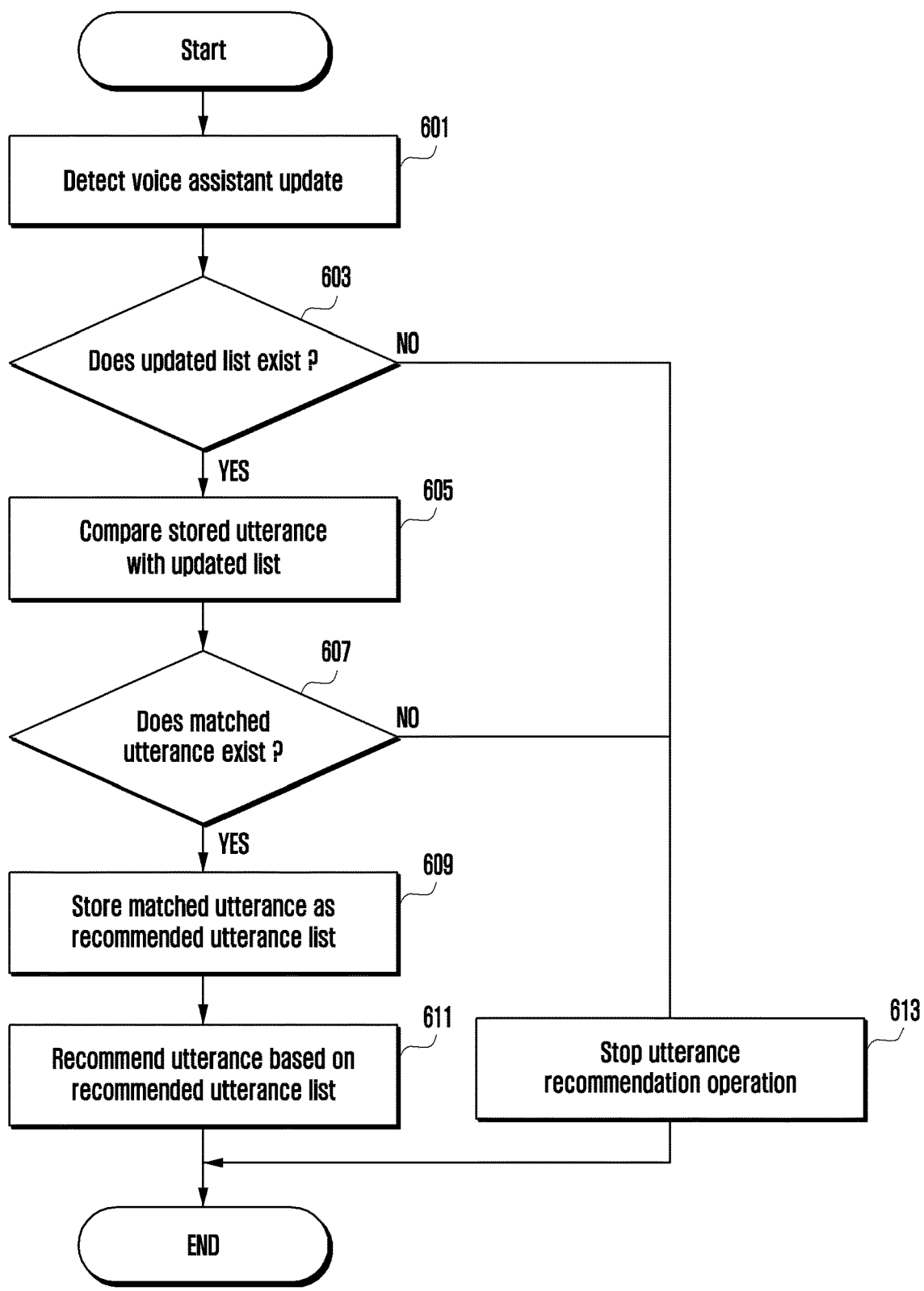
FIG. 6 is a flowchart illustrating an example method for providing a voice assistant service by an electronic device according to various embodiments.

FIG. 6 is a flowchart illustrating an example method for providing a voice assistant service by an electronic device 101 according to various embodiments.

At operation 601, the electronic device 101 may detect a voice assistant update under the control of the processor 120.

According to various embodiments, at the operation 601, the electronic device 101 may detect the voice assistant update received from the server 108 through the communication module 190 under the control of the processor 120. The voice assistant update may include the updated list 261 delivered from the update manager 260 of the server 108. The voice assistant update may include information about voice assistant performance improvement in the electronic device 101. The updated list 261 may include a list of user utterances supportable in the voice assistant service.

At operation 603, under the control of the processor 120, the electronic device 101 may determine whether the updated list 261 exists.

According to various embodiments, at the operation 603, under the control of the processor 120, the electronic device 101 may determine whether a supportable utterance exists in the updated list 261.

If the updated list 261 exists at the operation 603 ('Yes' branch of the operation 603), the electronic device 101 may perform operation 605 under the control of the processor 120.

If there is no updated list 261 at the operation 603 ('No' branch of the operation 603), the electronic device 101 may perform operation 613 under the control of the processor 120.

According to various embodiments, if a supportable utterance exists in the updated list 261 at the operation 603, the electronic device 101 may perform the operation 605 under the control of the processor 120.

According to various embodiments, if there is no supportable utterance in the updated list 261 at the operation 603, the electronic device 101 may perform the operation 613 under the control of the processor 120.

At operation 605, under the control of the processor 120, the electronic device 101 may compare a stored utterance with the updated list 261. The stored utterance may be data recoded in the utterance field of the database.

At operation 607, under the control of the processor 120, the electronic device 101 may determine whether a matched utterance exists.

According to various embodiments, at the operation 607, the electronic device 101 may determine whether the matched utterance exists by comparing the stored utterance with the updated list 261 under the control of the processor 120. By comparing the stored utterance with the updated list 261 under the control of the processor 120, the electronic device 101 may determine whether the stored utterance corresponds to the supportable utterance included in the updated list 261.

If the matched utterance exists through a comparison between the stored utterance and the updated list 261 at the operation 607 ('Yes' branch of the operation 607), the electronic device 101 may perform operation 609 under the control of the processor 120.

If there is no matched utterance through a comparison between the stored utterance and the updated list 261 at the operation 607 ('No' branch of the operation 607), the electronic device 101 may perform operation 613 under the control of the processor 120.

At the operation 613, the electronic device 101 may stop the utterance recommendation operation under the control of the processor 120.

At the operation 609, the electronic device 101 may store the matched utterance as a recommended utterance list under the control of the processor 120.

According to various embodiments, at the operation 609, under the control of the processor 120, the electronic device 101 may compare the stored utterances with the updated list 261 and, if the number of matched utterances is greater than or equal to a predetermined (e.g., specified) number, store the matched utterances as the recommended utterance list, based on the utterance recommendation priorities stored in the database. The recommended utterance list may be the same as the list of new recommended utterances and/or recommended utterances shown in Table 2.

According to various embodiments, at the operation 609, under the control of the processor 120, the electronic device 101 may compare the stored utterances with the updated list 261 and, if the number of matched utterances is greater than or equal to a predetermined (e.g., specified) number, store only the matched utterances within a predetermined (e.g., specified) rank as the recommended utterance list.

According to various embodiments, the electronic device 101 may determine an utterance recommendation priority based on data recorded in the field regarding the latest timestamp, the frequency, or the issue priority from among corresponding utterances between the received updated list 261 and the utterances stored in the database.

According to various embodiments, at the operation 609, under the control of the processor 120, the electronic device 101 may compare the stored utterances with the updated list 261 and, if the number of matched utterances is less than a predetermined (e.g., specified) number, store all the matched utterances as the recommended utterance list.

At operation 611, the electronic device 101 may recommend an utterance based on the recommended utterance list under the control of the processor 120.

According to various embodiments, at the operation 611, under the control of the processor 120, the electronic device 101 may display the recommended utterance on the display module 160 based on the recommended utterance list.

According to various embodiments, at the operation 611, under the control of the processor 120, the electronic device 101 may display the recommended utterance as a user interface on the display module 160 based on the recommended utterance list.

According to various embodiments, at the operation 611, under the control of the processor 120, the electronic device 101 may provide the recommended utterance as a hint to the user on the user interface.

According to various embodiments, at the operation 611, under the control of the processor 120, if there are a plurality of recommended utterances, the electronic device 101 may display the plurality of recommended utterances in a recommended utterance area (or user interface) on the display module 160 while switching them at a predetermined (e.g., specified) time interval.

Figure 7:
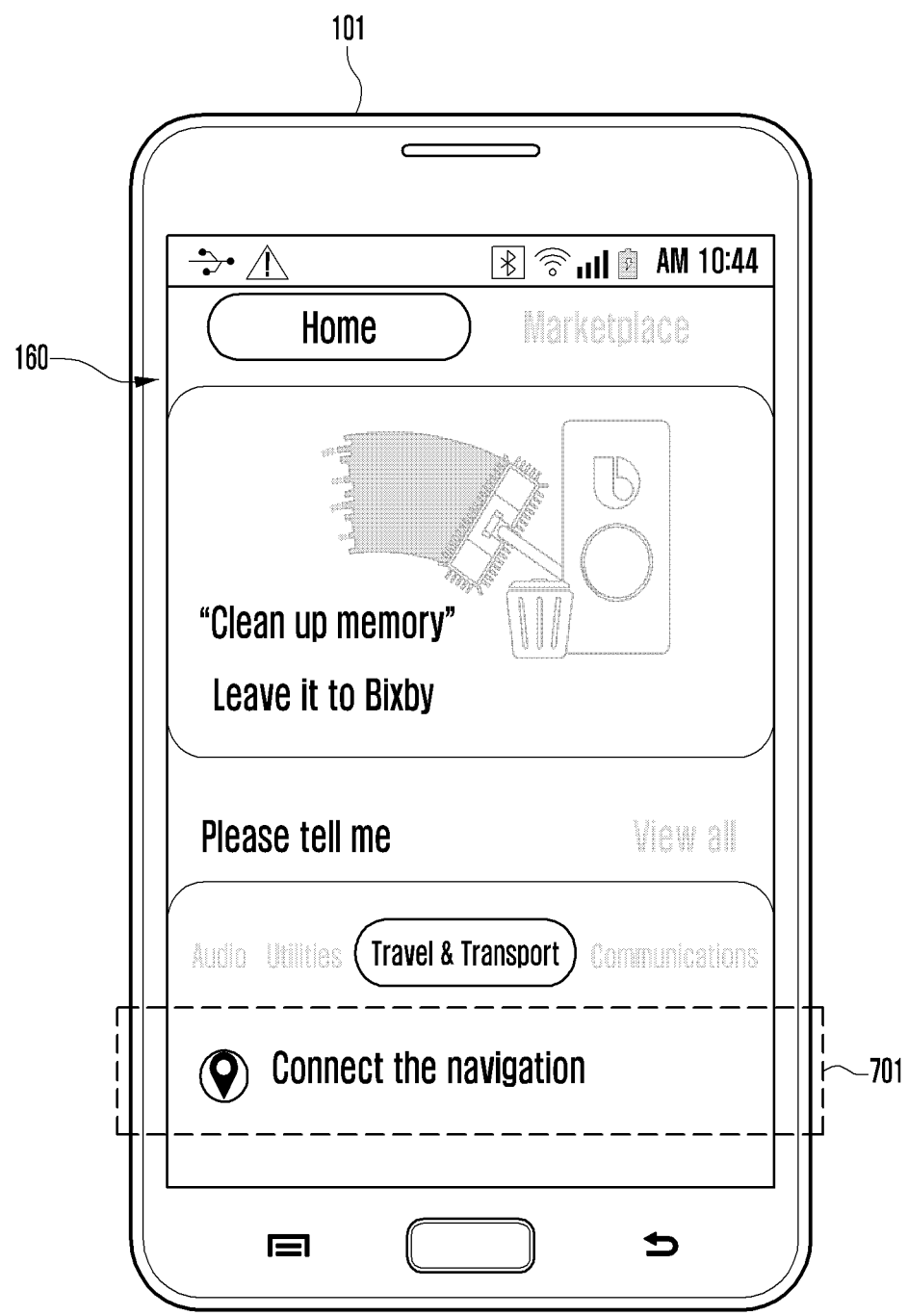
FIG. 7 is a diagram illustrating an example utterance recommendation of an electronic device according to various embodiments.

FIG. 7 is a diagram illustrating an example utterance recommendation of an electronic device 101 according to various embodiments.

The electronic device 101 may compare the stored utterance with the updated list 261 and store the matched utterances as the recommended utterance list in the memory 130.

When the user executes the voice assistant 200 in the electronic device 101, the electronic device 101 may recommend a supportable utterance and display it on the display module 160. If a certain utterance that was not supported before the update of the voice assistant 200 becomes supportable after the update, the electronic device 101 may display it as a recommended utterance on the display module 160.

For example, a certain utterance "connect the navigation" that was not supported before the update of the voice assistant 200 may be displayed as the recommended utterance in a user interface 701 on the display module 160. The user interface 701 displayed on the display module 160 may be an interface that provides the recommended utterance as a hint to the user.

Figure 8:
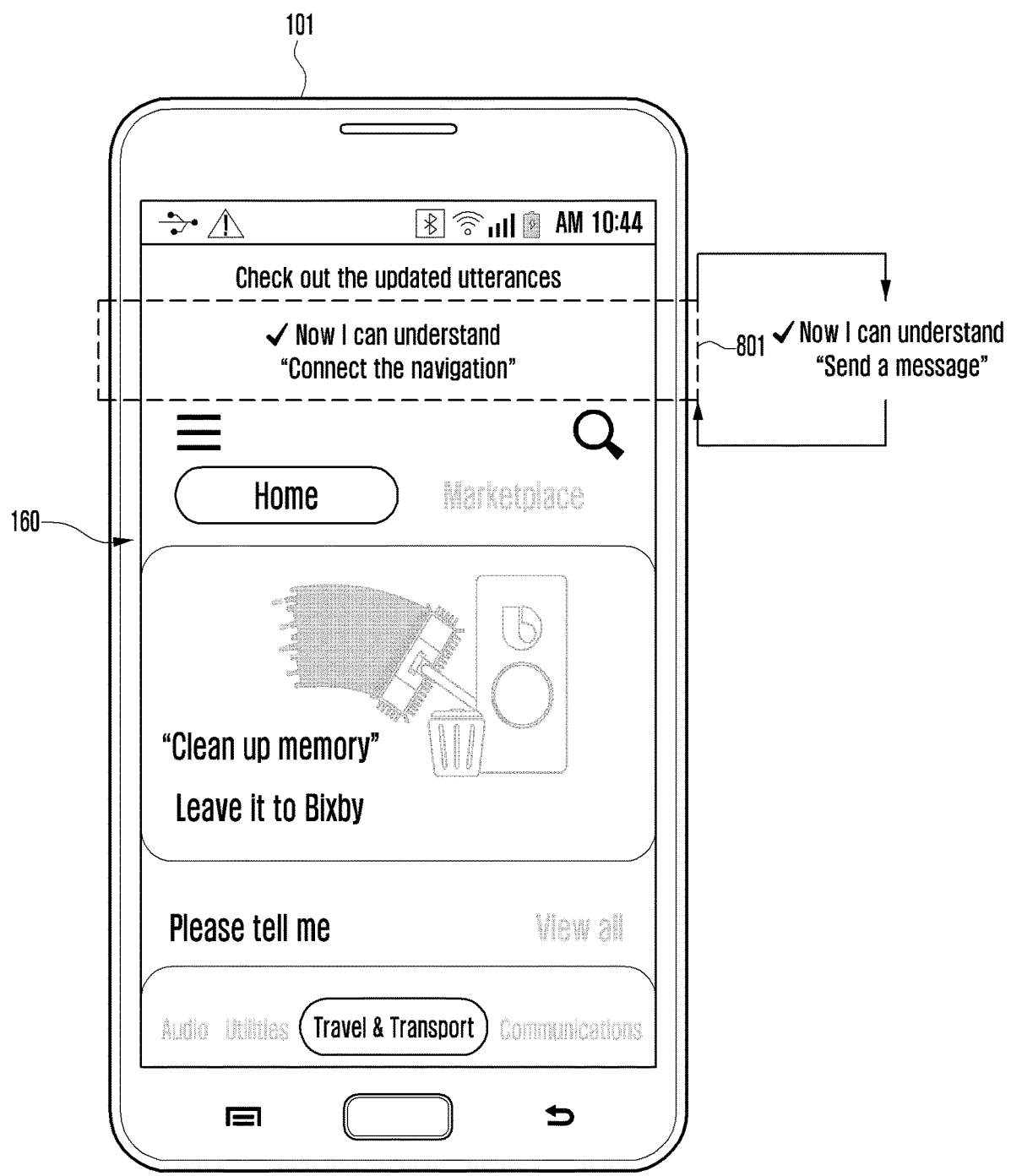
FIG. 8 is a diagram illustrating an example utterance recommendation of an electronic device according to various embodiments.

FIG. 8 is a diagram illustrating an example utterance recommendation of an electronic device 101 according to various embodiments.

When the user executes the voice assistant 200 in the electronic device 101, the electronic device 101 may recommend a supportable utterance and display it on the display module 160. If a certain utterance that was not supported before the update of the voice assistant 200 becomes supportable after the update, the electronic device 101 may display it as a recommended utterance on the display module 160. If there are a plurality of recommended utterances, the electronic device 101 may display the plurality of recommended utterances in a recommended utterance area on the display module 160 while switching them at a predetermined time interval.

For example, if a plurality of utterances such as "connect the navigation" and "send a message", which were not supported before the update of the voice assistant 200, become supportable after the update, the electronic device 101 may display them as recommended utterances in a user interface 801 on the display module 160. In this case, the electronic device 101 may display "connect the navigation" and "send a message" in the user interface 801 while switching them at a predetermined (e.g., specified) time interval.

According to various example embodiments of the disclosure, a method for providing a voice assistant service of an electronic device may include: detecting a voice assistant update; determining whether a supportable utterance exists in an updated list; based on there being a supportable utterance in the updated list, comparing utterances stored in a database with the updated list and determining whether a matched utterance exists; based on there being a matched utterance, storing the matched utterance as a recommended utterance list; and recommending an utterance based on the recommended utterance list.

According to various example embodiments, in the voice assistant service providing method of the electronic device, recommending the utterance based on the recommended utterance list may include: displaying a recommended utterance in a user interface based on the recommended utterance list.

According to various example embodiments, in the voice assistant service providing method of the electronic device, recommending the utterance based on the recommended utterance list may include: based on there being a plurality of recommended utterances, displaying the plurality of recommended utterances in a user interface while switching the plurality of recommended utterances at a specified time interval.

According to various example embodiments, in the voice assistant service providing method of the electronic device, storing the matched utterance as the recommended utterance list may include: based on a number of the matched utterances being greater than or equal to a specified number, storing the matched utterances as the recommended utterance list based on utterance recommendation priorities stored in the database.

According to various example embodiments, in the voice assistant service providing method of the electronic device 101, storing the matched utterance as the recommended utterance list may include, based on a number of the matched utterances being greater than or equal to a specified number, storing only the matched utterances within a specified rank as the recommended utterance list.

According to various example embodiments, in the voice assistant service providing method of the electronic device, storing the matched utterance as the recommended utterance list may include: based on a number of the matched utterances being less than a specified number, storing all the matched utterances as the recommended utterance list.

According to various example embodiments, in the voice assistant service providing method of the electronic device, storing the matched utterance as the recommended utterance list may include: determining an utterance recommendation priority based on data recorded in a field regarding a latest timestamp, frequency, or issue priority from among corresponding utterances between the updated list and the stored utterances.

According to various example embodiments, the voice assistant service providing method of the electronic device may further include: based on detecting an utterance input, determining whether a same utterance exists; based on the same utterance as the detected utterance input existing, storing or updating an utterance in the database; determining success or failure based on a result of an operation corresponding to the utterance; determining priorities of utterances recorded as failures and updating issue priorities in an issue priority field of the database; based on the issue priorities, determining whether a number of failed utterances is greater than or equal to a specified number; and based on the number of failed utterances being greater than or equal to the specified number, transmitting an utterance list to a server.

According to various example embodiments, the voice assistant service providing method of the electronic device may further include: based on the same utterance as the detected utterance input not existing, adding a new utterance to the database.

According to various example embodiments, in the voice assistant service providing method of the electronic device, the operation corresponding to the user utterance may include determining success or failure, based on a failure determination condition.

According to various example embodiments of the disclosure, an electronic device includes: a communication module comprising communication circuitry; a display module comprising a display; a memory; and a processor. The processor may be configured to: detect a voice assistant update, determine whether a supportable utterance exists in an updated list, based on there being a supportable utterance in the updated list, compare utterances stored in a database with the updated list and determine whether a matched utterance exists, based on there being a matched utterance, control the memory to store the matched utterance as a recommended utterance list, and recommend an utterance based on the recommended utterance list.

According to various example embodiments, the processor may be configured to control the display module to display a recommended utterance in a user interface based on the recommended utterance list.

According to various example embodiments, the processor may be configured to control the display module to, based on there being a plurality of recommended utterances, display the plurality of recommended utterances in a user interface while switching the plurality of recommended utterances at a specified time interval.

According to various example embodiments, the processor may be configured to control the memory to, based on a number of the matched utterances being greater than or equal to a specified number, store the matched utterances as the recommended utterance list based on utterance recommendation priorities stored in the database.

According to various example embodiments, the processor may be configured to control the memory to, based on a number of the matched utterances being greater than or equal to a specified number, store only the matched utterances within a specified rank as the recommended utterance list.

According to various example embodiments, the processor may be configured to control the memory to, based on a number of the matched utterances being less than a specified number, store all the matched utterances as the recommended utterance list.

According to various example embodiments, the processor may be configured to: determine an utterance recommendation priority based on data recorded in a field regarding a latest timestamp, frequency, or issue priority from among corresponding utterances between the updated list and the stored utterances.

According to various example embodiments, the processor may be configured to: based on detecting an utterance input, determine whether a same utterance exists, based on the same utterance as the detected utterance input existing, store or update an utterance in the database, determine success or failure based on a result of an operation corresponding to the utterance, determine priorities of utterances recorded as failures and update issue priorities in an issue priority field of the database, based on the issue priorities, determine whether a number of failed utterances is greater than or equal to a specified number, and based on the number of failed utterances being greater than or equal to the specified number, transmit an utterance list to a server.

According to various example embodiments, the processor may be configured to, based on the same utterance as the detected utterance input not existing, add a new utterance to the.

According to various example embodiments, the processor 120 may be configured to determine success or failure, based on a failure determination condition.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. The electronic devices according to embodiments of the disclosure are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., module or program) of the above-described components may include a singular or a plurality of entities, and some of the plurality of entities may be separately disposed in any other component. According to various embodiments, one or more components or operations among the above-described components may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for providing a voice assistant service of an electronic device, the method comprising:
    detecting a voice assistant update including an updated list of user utterances corresponding to one or more functions executable by the electronic device;
    based on detecting the voice assistant update, determining whether a supportable utterance corresponding to a function supportable in a voice assistant service exists in the updated list;
    based on the supportable utterance being in the updated list, comparing utterances stored in a database of the electronic device with the supportable utterance in the updated list and determining whether a matched utterance in the updated list between the utterances stored in the database and the supportable utterance exists;
    based on there being a matched utterance, storing the matched utterance as a recommended utterance list in a memory of the electronic device; and
    recommending an utterance for executing a function based on the recommended utterance list.

2. The method of claim 1, wherein recommending the utterance based on the recommended utterance list includes:

displaying a recommended utterance in a user interface based on the recommended utterance list.

3. The method of claim 1, wherein recommending the utterance based on the recommended utterance list includes: based on there being a plurality of recommended utterances, displaying the plurality of recommended utterances in a user interface while switching the plurality of recommended utterances at a specified time interval.

4. The method of claim 1, wherein storing the matched utterance as the recommended utterance list includes: based on a number of the matched utterances being greater than or equal to a specified number, storing the matched utterances as the recommended utterance list based on utterance recommendation priorities stored in the database.

5. The method of claim 1, wherein storing the matched utterance as the recommended utterance list includes: based on a number of the matched utterances being greater than or equal to a specified number, storing only the matched utterances within a specified rank as the recommended utterance list.

6. The method of claim 1, wherein storing the matched utterance as the recommended utterance list includes: based on a number of the matched utterances being less than a specified number, storing all the matched utterances as the recommended utterance list.

7. The method of claim 1, wherein storing the matched utterance as the recommended utterance list includes: determining an utterance recommendation priority based on data recorded in a field regarding a latest timestamp, frequency, or issue priority from among corresponding utterances between the updated list and the stored utterances.

8. The method of claim 1, further comprising:
based on detecting an utterance input, determining whether a same utterance exists;
based on the same utterance as the detected utterance input existing, storing or updating an utterance in the database;
determining success or failure based on a result of an operation corresponding to the utterance;
determining priorities of utterances recorded as failures and updating issue priorities in an issue priority field of the database;
based on the issue priorities, determining whether a number of failed utterances is greater than or equal to a specified number; and
based on the number of failed utterances being greater than or equal to the specified number, transmitting an utterance list to a server.

9. The method of claim 8, further comprising:
based on the same utterance as the detected user utterance input not existing, adding a new utterance to the database.

10. The method of claim 8, wherein the operation corresponding to the utterance includes determining success or failure, based on a failure determination condition.

11. An electronic device comprising:
a communication module comprising communication circuitry;
a display module comprising a display;
a memory; and
a processor, wherein the processor is configured to:
detect a voice assistant update including an updated list of user utterances corresponding to one or more functions executable by the electronic device,
based on detecting the voice assistant update, determine whether a supportable utterance corresponding to a function supportable in a voice assistant service exists in an the updated list,
based on the supportable utterance being in the updated list, compare utterances stored in a database of the electronic device with the supportable utterance in the updated list and determine whether a matched utterance in the updated list between the utterances stored in the database and the supportable utterance exists,
based on there being a matched utterance, control the memory to store the matched utterance as a recommended utterance list in the memory, and
recommend an utterance for executing a function based on the recommended utterance list.

12. The electronic device of claim 11, wherein the processor is configured to: control the display module to display a recommended utterance in a user interface based on the recommended utterance list.

13. The electronic device of claim 11, wherein the processor is configured to: control the display module to, based on there being a plurality of recommended utterances, display the plurality of recommended utterances in a user interface while switching the plurality of recommended utterances at a specified time interval.

14. The electronic device of claim 11, wherein the processor is configured to: control the memory to, based on a number of the matched utterances being greater than or equal to a specified number, store the matched utterances as the recommended utterance list based on utterance recommendation priorities stored in the database.

15. The electronic device of claim 11, wherein the processor is configured to: control the memory to, based on a number of the matched utterances being greater than or equal to a specified number, store only the matched utterances within a specified rank as the recommended utterance list.

16. The electronic device of claim 11, wherein the processor is configured to: control the memory to, based on a number of the matched utterances being less than a specified number, store all the matched utterances as the recommended utterance list.

17. The electronic device of claim 11, wherein the processor is configured to: determine an utterance recommendation priority based on data recorded in a field regarding a latest timestamp, frequency, or issue priority from among corresponding utterances between the updated list and the stored utterances.

18. The electronic device of claim 11, wherein the processor is configured to:
based on detecting an utterance input, determine whether a same utterance exists,
based on the same utterance as the detected utterance input existing, store or update an utterance in the database,
determine success or failure based on a result of an operation corresponding to the utterance,
determine priorities of utterances recorded as failures and update issue priorities in an issue priority field of the database,
based on the issue priorities, determine whether a number of failed utterances is greater than or equal to a specified number, and
based on the number of failed utterances being greater than or equal to the specified number, transmit an utterance list to a server.

19. The electronic device of claim 18, wherein the processor is configured to: based on the same utterance as the detected utterance input not existing, add a new utterance to the database.

20. The electronic device of claim 18, wherein the processor is configured to determine success or failure, based on a failure determination condition.

\* \* \* \* \*